United States Patent [19]
Daniels

[11] Patent Number: 5,357,161
[45] Date of Patent: Oct. 18, 1994

[54] MOTOR ENCLOSURE

[75] Inventor: Nicholas R. Daniels, Dellwood, Mo.

[73] Assignee: Emerson Electric Co., St. Louis, Mo.

[21] Appl. No.: 118,967

[22] Filed: Sep. 9, 1993

[51] Int. Cl.⁵ .......................... H02K 5/04; H02K 5/26
[52] U.S. Cl. ........................................ 310/89; 174/50
[58] Field of Search .................... 310/89, 68 R, 68 A, 310/85, 42; 174/50

[56] References Cited

U.S. PATENT DOCUMENTS

| | | | |
|---|---|---|---|
| 2,024,726 | 12/1935 | Ehrenfeld | 172/36 |
| 3,231,767 | 1/1966 | Powell | 310/71 |
| 4,518,896 | 5/1985 | Miles, Jr. | 315/162 |
| 4,683,369 | 7/1987 | Rieckman et al. | 219/364 |
| 4,734,602 | 3/1988 | Hauser et al. | 310/68 C |
| 4,858,303 | 8/1989 | Fisher | 29/596 |
| 4,937,482 | 6/1990 | Dohogne | 310/71 |
| 4,963,777 | 10/1990 | Blum | 310/68 A |
| 5,245,237 | 9/1993 | Fisher et al. | 310/89 |

Primary Examiner—Steven L. Stephan
Assistant Examiner—D. R. Haszko
Attorney, Agent, or Firm—Polster, Lieder, Woodruff & Lucchesi

[57] ABSTRACT

An enclosure is provided for a motor assembly having a stator, a rotor, a shaft extending from the rotor, a first end shield and a second end shield which rotatably support the shaft, and a voltage change switch. The enclosure encases the voltage change switch so that the voltage change switch is not normally accessible. The enclosure includes a housing which at least partly covers one of the endshields and a cover which covers the voltage change switch. The cover pivots with respect to the housing so that voltage change switch may be accessed and operated. The cover is held in place by a single screw to make accessibility, when needed, simple.

15 Claims, 4 Drawing Sheets

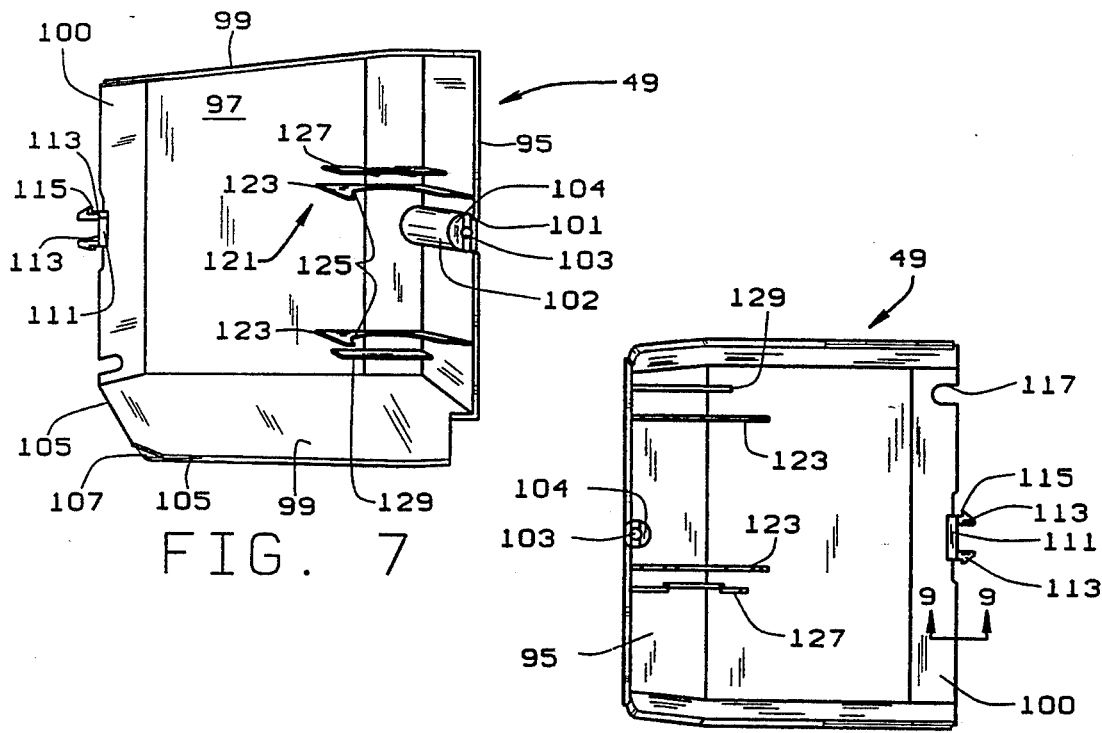
FIG. 7
FIG. 8
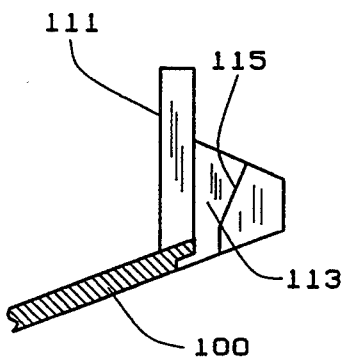
FIG. 9
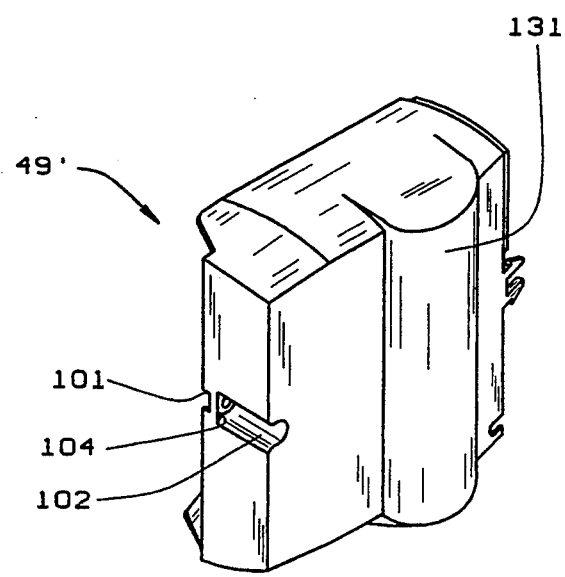
FIG. 10

MOTOR ENCLOSURE

BACKGROUND OF THE INVENTION

This invention relates to motor assemblies, and, in particular, to enclosures or housings for motors having voltage range switches.

Motors which may be used in environments having different voltage supplies are commonly provided with a voltage change switch so that the same motor may be used with different voltage supplies. If the motor is moved to a location having a different voltage supply, all that needs to be done is flip the voltage change switch. This obviates the need to buy another motor, or to produce multiple motors, for different voltage supplies.

The voltage change switches have, in the past, been exposed so that they are easily accessible and easily operable. They can often be activated merely with the touch of a finger. This easy accessibility and operability creates a condition in which the switch may be accidentally flipped such that the motor is switched to the wrong voltage setting. This can ruin the motor when the motor is subsequently used. It is desirable to protect the voltage change switch against inadvertent operation, yet make it accessible so that the motor windings can be properly connected when required by the operating supply voltage.

SUMMARY OF THE INVENTION

One object of the present invention is to provide an enclosure for a motor assembly having a voltage change switch.

Another object is to provide such an enclosure which requires a tool to operate the voltage change switch.

Another object is to provide such an enclosure which is economical to produce.

These and other objects will become apparent to those skilled in the art in view of the following disclosure and accompanying drawings.

Briefly stated, an enclosure is provided for a motor assembly having a stator, a rotor, a shaft extending from the rotor, a first end shield and a second end shield which rotatably support the shaft, and a voltage change switch. The enclosure encases the voltage change switch and includes means for accessing the voltage change switch. The enclosure includes a housing which at least partly covers one of the endshields and a cover which covers the voltage change switch. The cover is pivotal in part between a closed position in which the voltage change switch is enclosed and an open position in which the voltage change switch is accessible. The housing includes an inner edge having a pair of spaced apart walls defining a gap. The cover has a spaced apart arms having shoulders which cooperate with the housing walls to secure the cover to the housing. The arm shoulders are angled to define a degree of pivotal movement of the cover with respect to the housing sufficient to expose the voltage change switch.

BRIEF DESCRIPTION OF THE DRAWINGS

FIG. 7 is a perspective view of the inside of a capacitor cover of the enclosure;

FIG. 8 is a plan view of the inside of the capacitor cover;

FIG. 9 is an enlarged side view of a connector of the capacitor cover taken along line 9—9 of FIG. 8; and FIG. 10 is a perspective view of a second capacitor cover of the enclosure.

DESCRIPTION OF THE PREFERRED EMBODIMENT

Figure 1:
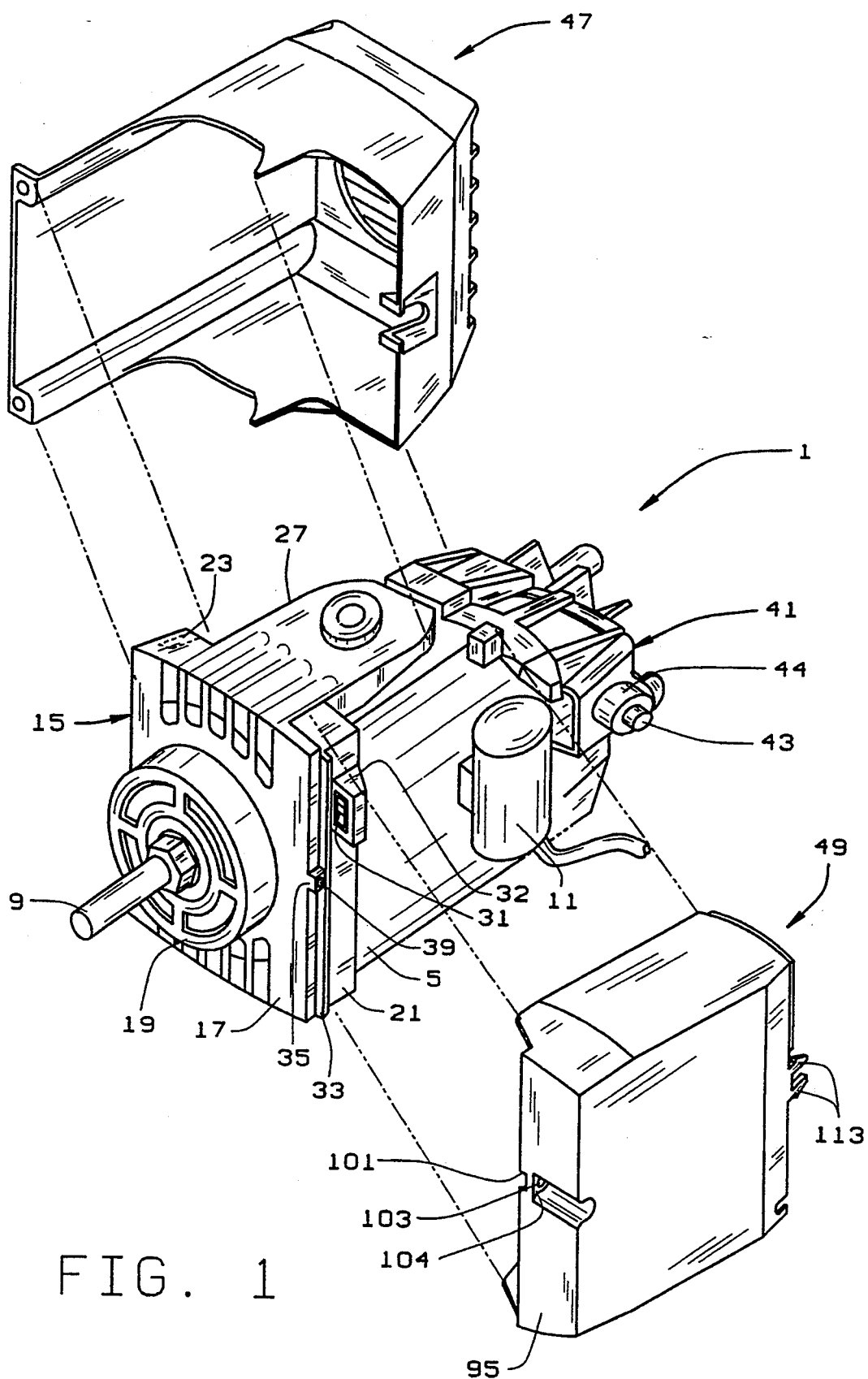
FIG. 1 is an exploded perspective view of a motor and an enclosure of the present invention.

A motor assembly 1 having an enclosure 3 including a housing 47 and a cover 49 is shown in FIG. 1. Motor assembly 1 has a stator 5, a rotor, and a shaft 9 extending axially from the rotor. Motor 1 is a capacitor start motor having a capacitor 11 and a centrifugal starting switch. A blade endshield 15 covers one end of motor assembly 1. Endshield 15 preferably has a rectangular front 17 having a raised, circular portion 19 which rotatably supports one end of shaft 9. A circumferential wall 21 extends axially inward from front 17 toward the stator 5. Forward facing screw holes 23 are formed in the corners of the wall 21, at the bottom or inside of endshield 15. A pair of extensions 27 extend from either side of end shield 15. The extensions are substantially identical and have the same general shape in plan. One of the extensions 27 has a mount (not shown) for mounting the motor to an appliance, such as a radial arm saw. A voltage change switch 31 is mounted to a wall of endshield 15, preferably to be on the same side of stator 5 as capacitor 11. A small outwardly extending wall 33 is formed in the front of endshield wall 21 spaced slightly back from endshield front wall 17. Switch 31 is held in a switch bracket 32 which extends outwardly from wall 21 slightly behind wall 33. A protrusion 35, positioned approximately in the middle of wall 33, extends from the wall to be even with front wall 17. A screw hole 39 is formed in the top protrusion 35.

A second endshield 41 covers the other end of motor 1. Endshield 41 is preferably somewhat frustoconical in shape. A reset button 43 is mounted to endshield 41. Button 43 is part of a switch 44 which is mounted to endshield 41. The reset button is preferably on the same side of the motor assembly as the voltage change switch 31 and the capacitor 11. Reset button 43, voltage change switch 31, and capacitor 11 are all connected to control circuitry of the motor.

Figure 2:
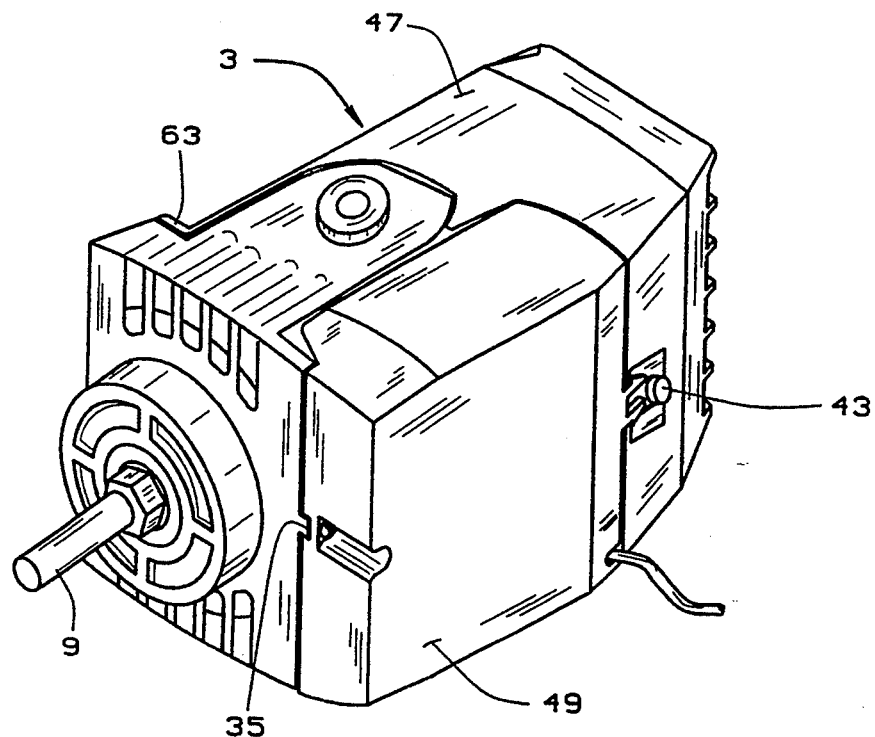
FIG. 2 is a perspective view of the motor with the enclosure thereon in a closed position, covering a voltage change switch of the motor.

Enclosure 3 includes a housing 47 and a capacitor cover 49 which, when assembled on motor 1, fit around extensions 27 to enclose motor assembly 1 as seen in FIG. 2. As will be explained below, enclosure 3 fully encloses the motor to cover the voltage change switch. The enclosure is pivotal in part between a closed position (FIG. 2) in which the voltage change switch is enclosed and not accessible and an open position (FIG. 3) in which the voltage change switch is exposed and accessible. The accessibility of the voltage change switch, although easy, requires a tool, such as a screwdriver, as will be explained below. Thus, the switch cannot be accidentally changed.

Figure 4:
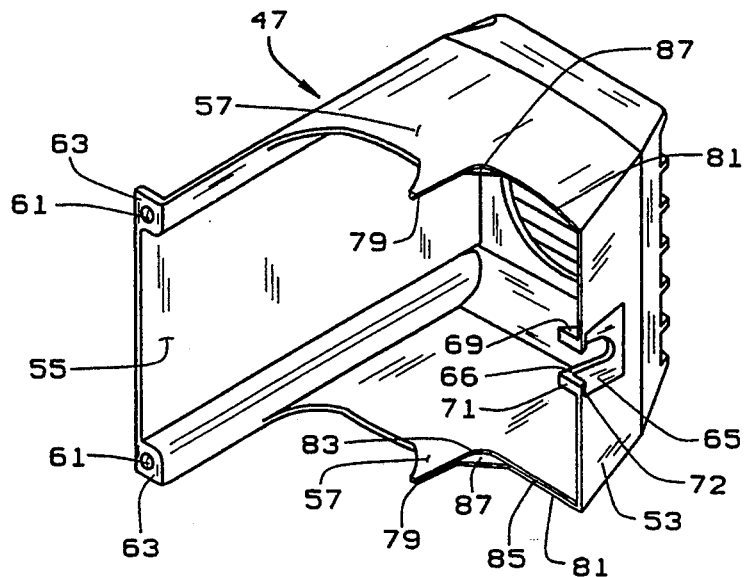
FIG. 4 is a front perspective view of a housing of the enclosure.
Figure 5:
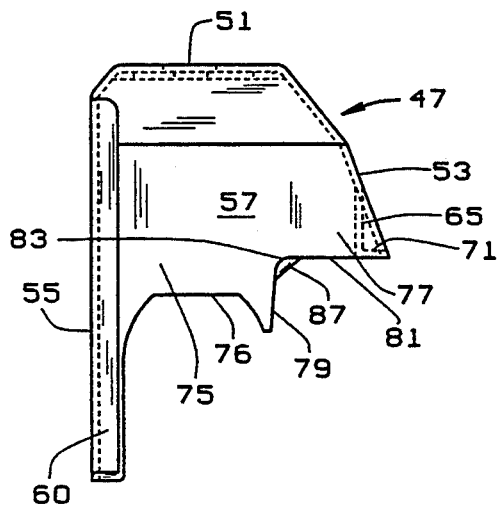
FIG. 5 is a side plan view of the housing.
Figure 6:
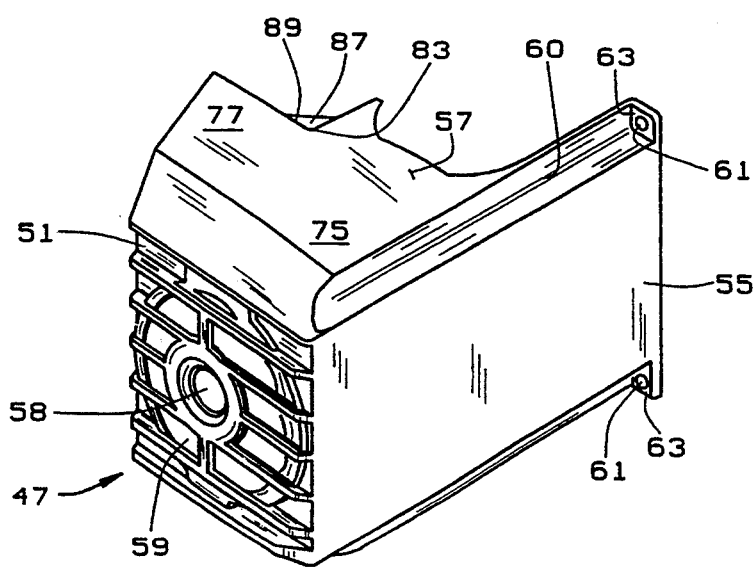
FIG. 6 is a rear perspective view of the housing.

Housing 47, shown more clearly in FIGS. 4–6, has an end wall 51, a front wall 53, a bottom wall 55, and side walls 57. Front, back, side top, and bottom are made with reference to the directions as shown in FIG. 2. End wall 51 has slots 59 which define a vent through which air may pass to cool the motor 1. A central hole 58 is formed in vent 59 through which shaft 9 extends when housing 49 is placed on motor 1. Bottom wall 55 is elongate and extends to the bottom of endshield wall 21. An arcuate channel 60 is formed at the sides of bottom wall 55. Wall 63 closes an end of channel 60 remote from end wall 51. Screw holes 61 are formed in walls 63. Walls 63 are positioned to be adjacent to the bottom of endshield wall 21 when placed on motor assembly 1 so that screw holes 61 are aligned with screw holes 23. Screws extend through screw holes 61 into screw holes 23 to secure housing 47 to motor 1.

Top wall 53 and side walls 57 are angled slightly outwardly to conform to the generally frustoconical shape of endshield 41. Wall 53 extends forward to a point slightly axially inward of reset button 43. A generally horizontal portion 65 is formed at the back of wall 53. Portion 65 defines a slot 66 through which reset button 43 extends so that it is accessible when housing 47 is placed about motor 1. Portion 65 has side walls 69 and front walls 71 to define shoulders 72.

The side walls 57 are substantially identical. They have lower portions 75 and upper portions 77. (FIG. 5) Forward portions 75 have inner edges shaped complimentary to the edges of extensions 27. Upper portions 77 define a horizontal edge 79 and a vertical edge 81 which are joined at a corner 83. The horizontal and vertical edges are rabbetted to define an outward, forwardly extending shoulder 85 which continues across the inner edge of top wall 53. Internal gussets 87 extend across corners 83. The outer surface of gussets 87 is spaced slightly inwardly of the outer surface of housing 47 to define outwardly extending shoulders 89.

Turning to FIGS. 7–9, capacitor cover 49 includes a front wall 95, a top wall 97, and side walls 99. The end of wall 97, remote from front wall 95, angles slightly inwardly as at 100. When cover 49 is placed on motor 1, end wall 95 rests on endshield wall 21 against endshield wall 33 to enclose the wall and voltage change switch 31. A slot 101 is formed in wall 95 which fits over the endshield protrusion 35 to facilitate the positioning of cover 49 on motor 1. A radial channel 102 is formed in end wall 95 and has a floor 104 formed at its bottom. A screw hole 103 is formed in floor 104. Screw hole 103 is aligned with endshield screw hole 39 when cover 49 is placed on motor assembly 1. A fastener extends through screw hole 103 into screw hole 39 to removably secure cover 49 to motor assembly 1. The use of only one fastener is preferred to secure cover 49 to motor assembly 1, however, more than one fastener could be used.

The side walls 99 are sized to extend to endshield extensions 27, and give cover 49 sufficient height to fit over capacitor 11. The rearward edges of walls 99 are rabbetted to define a shoulder 105 complimentary to shoulder 85 of housing 47. Shoulder 105 extends partially along the bottom of walls 99 and along the trailing edge of wall 97. An externally rabbeted corner forms a shoulder 107 complimentary to housing shoulder 89. Cover shoulders 105 mate with housing shoulders 85 when the enclosure is placed on motor 1. External corner rabbets 107 of cover 49 mate with internal corner gussets 87. Mating of rabbets 85 and gussets 87 on housing 47 with rabbets 105 and 107 of cover 49 provide an interlocking rigidity between housing 47 and cover 49.

An inwardly extending wall 111 is formed at the approximate center of top wall 97. Wall 111 is sized and shaped to close housing slot 66 when enclosure 3 is assembled. A pair of arms 113 extend outwardly from wall 111. Arms 113 have back shoulders 115 which cooperate with shoulders 72 of slot 66 to hold cover 49 against housing 47. Shoulders 115 extend diagonally across arms 113, as seen in FIG. 9, to allow the cover 49 to pivot with respect to housing 47. The angle of shoulder 115 provides cover 49 with a sufficient degree of motion to fully expose voltage change switch 31 when the cover is pivoted. The interaction of shoulder 115 with slot shoulders 72 to prevent the cover 49 from sliding off housing 47 and, thus, to positively hold cover 49 on housing 47. Wall 97 also has a slot 117 formed therein to allow a cord to exit enclosure 3 to connect motor 1 to a source of electricity.

Turning to FIGS. 7–8, a capacitor bracket 121 is formed in cover 49 to secure capacitor 11 in cover 49. Bracket 121 has a pair of side legs 123 which define generally semicircular cutouts 125 which receive capacitor 11. A positioning wall 127 extends from wall 97 slightly spaced from one of the legs 123. Bracket 121 is preferably formed close to one of the side walls 99, and wall 127 acts as a stop to prevent excess movement of capacitor 11 in assembly 1. A second, shorter wall 129 is formed between the outer leg 123 and the wall 99.

To assemble enclosure 3 around motor 1, the housing 47 is slid over endshield 41. The shaft extends through hole 58 formed in vent 59, the reset button is received in slot 66 to facilitate positioning of housing 47 on motor 1 and channel walls 63 are positioned adjacent endshield wall 21 so that holes 61 are aligned with endshield screw holes 23. The housing 47 is secured to motor 1 by screws which extend through holes 61 and into holes 23. The cover 49 is then placed on motor 1 so that its shoulders 105 and 107 cooperate with the shoulders 85 and 87 of housing 47 and the slot 101 fits over endshield protrusion 35. Cover 49 is secured to endshield 15 by a screw which extends through cover screw hole 103 and endshield screw hole 39.

Figure 3:
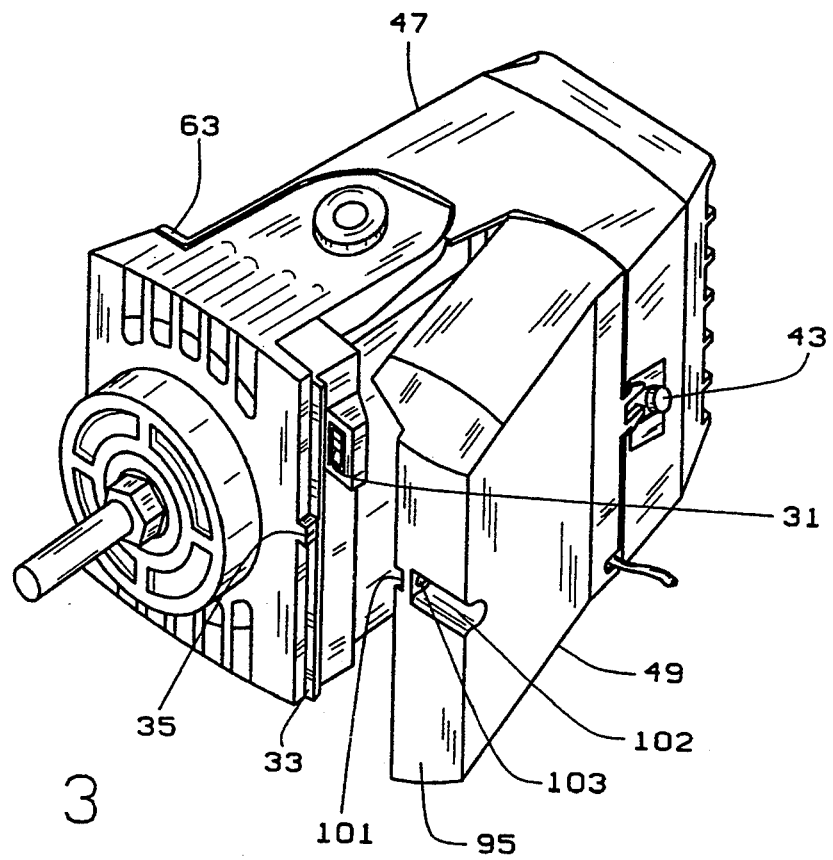
FIG. 3 is a perspective view showing the enclosure in an open position with the voltage change switch accessible.

As set forth above, cover 49 encloses voltage change switch 31. The diagonal configuration of arm shoulders 115 allow cover 49 to pivot with respect to housing 47 as shown in FIG. 3. Thus, by unfastening cover 49 from endshield 15 (by removing the screw extending through screw holes 103 and 39), cover 49 may be pivoted upwardly, as shown in FIG. 3, to allow access to the voltage change switch, should it need to be flipped. The angle of shoulder 115 is formed so that cover 49 has a sufficient degree of movement to fully expose switch 31. Shoulder 115 also acts as a stop to prevent too much pivotal movement of cover 49 to prevent it from coming off of motor 1. As can be appreciated, this structure encloses voltage change switch 31 so that a tool is needed, as required by the UL, to change the switch 31. However, the access to switch 31 is not complicated and can be accomplished simply with the use of a screw driver. No special tools are needed.

A second embodiment of cover 49 is shown in FIG. 10. Some capacitor start motors have two capacitors. The motor of assembly 1 is shown to have only one capacitor. Cover 49' is substantially identical to cover 49. However, it includes an arced portion 131 which accommodates a second capacitor.

The foregoing is set forth for illustrative purposes only and is not meant to be limiting. Variations, within the scope of the appended claims may be apparent to those skilled in the art. For example, cover 49 could be hinged to housing 47 so that the two are not separable. Rather than having the full cover to pivot with respect to housing 47, cover 49 could be provided with a pivotable opening which exposes switch 31. Further, the enclosure could be used to encase components other than voltage change switches. These variations are merely illustrative.

I claim:

1. An enclosure for a motor assembly, said motor assembly having a stator, a rotor, a shaft extending from the rotor, a first end shield and a second end shield which rotatably support the shaft, and a voltage change switch, said motor assembly defining a front, a back, and sides extending between said first and second end shields; the enclosure including:

a housing which at least partly covers one of said endshields and extends along a back surface of said motor assembly to the other of said endshields, said housing covering a portion of a front of said motor assembly; and and a pivotable cover encasing said voltage change switch and the portion of said motor assembly front not covered by said housing, said cover being pivotally connected to said housing, said cover being pivotable between a first closed position in which said voltage change switch is inaccessible and an open position in which said voltage change switch is accessible.

2. A dynamoelectric machine comprising:

a stator assembly adapted to receive a rotor assembly;

a rotor assembly including a shaft operatively associated with said stator assembly;

a pair of end shields rotatively supporting said shaft for rotation of said rotor assembly with respect to said stator assembly;

a voltage change switch operatively connected to said stator assembly; and an enclosure about at least a part of said stator assembly and fully enclosing said voltage change switch, said enclosure including a portion movable between a first position in which said voltage change switch is accessible and a second position in which said voltage change switch is accessible, said enclosure movable portion being pivotally mounted to provide access to said voltage change switch, said movable portion being mounted to pivot radially with respect to said rotor shaft.

3. The enclosure of claim 1 wherein said cover is pivotally connected to said housing.

4. The enclosure of claim 3 wherein said cover and housing are separate, said housing having an inner edge and a pair of spaced apart walls extending from said inner edge, said cover having a spaced apart arms defining shoulders, said cover shoulders cooperating with said housing walls to pivotally secure said cover to said housing.

5. The enclosure of claim 4 wherein said arm shoulders are angled to define a degree of pivot movement of said cover with respect to said housing sufficient to expose said voltage change switch.

6. The enclosure of claim 5 wherein an inner edge of said housing defines a shoulder and an inner edge of said cover defines a shoulder, said cover and housing shoulders being complimentary formed to position and positively hold said cover with respect to said housing.

7. The enclosure of claim 6 wherein said housing is secured to said motor by at least one fastener.

8. The enclosure of claim 7 wherein said cover is removably secured to said motor by at least one fastener.

9. The enclosure of claim 8 wherein said cover includes a capacitor bracket.

10. A motor assembly including a stator housing a rotor, a rotor shaft extending from said rotor, first and second endshields which support said rotor, a voltage change switch mounted to one of said endshields and extending radially from said rotor shaft, and an enclosure which fully encloses said voltage change switch, said enclosure having a portion pivotal radially outwardly with respect to said rotor shaft between a closed position in which said voltage change switch is not accessible and an open position in which said voltage change switch is accessible.

11. The motor assembly of claim 10 wherein the enclosure includes a housing which at least partly covers one of said endshields and a cover which covers said voltage change switch; said portion including said cover, said cover being at least partly pivotal to provide access to said voltage change switch.

12. The motor assembly of claim 11 wherein said cover is pivotally connected to said housing.

13. The enclosure of claim 3 said housing and cover each including a rabbetted edge the rabbetted edge of said cover mating with the rabbeted edge of said housing.

14. The enclosure of claim 7 wherein said endshield includes a protrusion extending from a wall of one of said endshields, said protrusion defining a screw hold; said cover defining a channel in a front wall, said channel having a floor defining a screw hole, said cover screw hole being alignable with said protrusion screw hole.

15. The enclosure of claim 14, said cover including a slot formed in said cover forward wall beneath said channel floor, said slot being shaped to fit over said endshield protrusion to facilitate securement of said cover to said end shield.

* * * * *